United States Patent
Shoji et al.

(10) Patent No.: US 11,131,596 B2
(45) Date of Patent: Sep. 28, 2021

(54) VIBRATION DETECTION DEVICE, AND UNBALANCE DETECTION DEVICE INCLUDING THE VIBRATION DETECTION DEVICE

(71) Applicant: MITSUBISHI HEAVY INDUSTRIES ENGINE & TURBOCHARGER, LTD., Sagamihara (JP)

(72) Inventors: Takanori Shoji, Sagamihara (JP); Hideo Mori, Sagamihara (JP); Shota Yoshikawa, Sagamihara (JP); Yousuke Danmoto, Sagamihara (JP); Shuichi Miura, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 316 days.

(21) Appl. No.: 16/306,046
(22) PCT Filed: Oct. 16, 2017
(86) PCT No.: PCT/JP2017/037431
§ 371 (c)(1),
(2) Date: Nov. 30, 2018
(87) PCT Pub. No.: WO2019/077667
PCT Pub. Date: Apr. 25, 2019

(65) Prior Publication Data
US 2020/0232867 A1 Jul. 23, 2020

(51) Int. Cl.
*G01M 1/16* (2006.01)
*G01M 13/045* (2019.01)
(52) U.S. Cl.
CPC ............ *G01M 1/16* (2013.01); *G01M 13/045* (2013.01)

(58) Field of Classification Search
CPC .............................. G01M 1/16; G01M 13/045
See application file for complete search history.

(56) References Cited

U.S. PATENT DOCUMENTS 4,694,689 A * 9/1987 Kawasaki ............... G01M 1/04
73/114.77
4,864,859 A 9/1989 Jensen
(Continued)

FOREIGN PATENT DOCUMENTS

EP 0 699 900 A2 3/1996
EP 0699900 A2 * 3/1996 .............. G01M 1/16
(Continued)

OTHER PUBLICATIONS

Extended European Search Report dated Oct. 7, 2019 issued in the corresponding European Patent Application No. 17912350.0.
(Continued)

*Primary Examiner* — Alexander Satanovsky
*Assistant Examiner* — Lyudmila Zaykova-Feldman
(74) *Attorney, Agent, or Firm* — Birch, Stewart, Kolasch & Birch, LLP

(57) ABSTRACT

A vibration detection device for detecting vibration of a cartridge including a bearing housing that accommodates a rotor coupling a wheel and a rotor shaft, and a bearing rotatably supporting the rotor, the bearing housing including a lubricant-oil passage port for allowing lubricant oil to pass through an interior of the bearing housing, includes: a sensor mount attached to an oil-flow-passage forming member configured to be capable of connecting to and separating from the bearing housing, the oil-flow-passage forming member including, inside thereof, an oil flow passage through which one of lubricant oil to be supplied to the interior of the bearing housing via the lubricant-oil passage port or lubricant oil discharged from the interior of the bearing housing via the lubricant-oil passage port flows; a
(Continued)

vibration sensor disposed on the sensor mount; and a vibration transmission leg portion connected to the sensor mount and configured to be in contact with the bearing housing in a state where the oil-flow-passage forming member is connected to the bearing housing.

6 Claims, 5 Drawing Sheets

(56) References Cited

U.S. PATENT DOCUMENTS

| | | | |
|---|---|---|---|
| 2015/0337721 A1* | 11/2015 | Kocher | F04D 25/024 |
| | | | 415/111 |
| 2016/0363134 A1 | 12/2016 | Seike et al. | |
| 2018/0080499 A1* | 3/2018 | An | F16C 35/077 |
| 2019/0219052 A1* | 7/2019 | Yamaguchi | H02K 9/19 |

FOREIGN PATENT DOCUMENTS

| | | |
|---|---|---|
| GB | 2 173 602 A | 10/1986 |
| JP | H03-503315 A | 7/1991 |
| JP | 4232841 B2 | 3/2009 |
| JP | 2016-148625 A | 8/2016 |
| WO | WO 2015/132896 A1 | 9/2015 |

OTHER PUBLICATIONS

Chinese Office Action issued in Chinese Application No. 201780038425.3, dated Jul. 24, 2020.

* cited by examiner

VIBRATION DETECTION DEVICE, AND UNBALANCE DETECTION DEVICE INCLUDING THE VIBRATION DETECTION DEVICE

TECHNICAL FIELD

The present disclosure relates to a vibration detection device for detecting vibration of a cartridge having a bearing housing accommodating a rotor coupling a wheel and a rotor shaft, and a bearing supporting the rotor rotatably, the bearing housing further including a lubricant-oil passage port for allowing lubricant oil to pass through the interior of the bearing housing.

BACKGROUND ART

For a cartridge, which is a core component of a turbocharger or an electric compressor, a balancing work of a rotor forming the cartridge is performed after assembling the cartridge (see Patent Documents 1 to 4, for instance). This balancing work includes an unbalance detection work of detecting unbalance of a rotor while the rotor is in rotation, and is a series of works including slightly grinding a part of the rotor to balance the rotor, for instance, if unbalance of the rotor is detected. By performing a balancing work on the rotor at the time of production, it is possible to prevent vibration upon rotation due to unbalance of the rotor that rotates at a high speed during operation of the engine (rotor vibration), as well as noise and breakage due to the vibration.

More specifically, during an unbalance detection work, while a cartridge is supported (fixed) with an unbalance detection device, air is supplied to a wheel such as a compressor wheel to create a state where the rotor is rotating, and vibration upon rotation due to unbalance of the rotor is detected with an acceleration sensor. The phase of the rotor that is causing vibration is determined on the basis of a relationship between the vibration signal detected with the acceleration sensor and the phase of the rotor detected simultaneously with the vibration signal. Then, the rotor is ground for balancing, where the relationship (effect vector) between the mass to be ground (unit weight) and a change in the magnitude of vibration accompanying the grinding is obtained in advance through experiments by using a cartridge of the same model (product). Further, on the basis of the above vibration signal, phase, and effect vector (experiment result), grinding information that includes the optimum mass (weight) and position for balancing of the rotor is calculated, and the rotor is ground on the basis of the grinding information.

For instance, in Patent Documents 2 to 4, the acceleration sensor is disposed on a position that is in direct contact with the cartridge, in the unbalance detection device. Specifically, in Patent Document 2, the acceleration sensor is mounted to a dummy housing fixing the cartridge. In Patent Documents 3 and 4, the unbalance detection device uses two housing members to accommodate each of a turbine wheel or a compressor wheel of the rotor, and supports the bearing housing directly from both sides. The acceleration sensor is disposed on a housing member that is in direct contact with the bearing housing. Accordingly, it is unnecessary to perform a step of providing an acceleration sensor for each cartridge every time each of manufactured turbo cartridges is provided for an unbalance detection device, which makes it possible to detect vibration of the rotor appropriately while improving the efficiency of the sensor providing work in the balancing work.

CITATION LIST

Patent Literature

Patent Document 1: WO2015/132896A
Patent Document 2: JP2016-148625A
Patent Document 3: JPH3-503315A
Patent Document 4: JP4232841B

SUMMARY

Problems to be Solved

As described in Patent Documents 2 to 4, it is possible to improve the efficiency of balancing works with an acceleration sensor disposed on the unbalance detection device, but this requires good transmission of vibration of the rotor upon rotation to the unbalance detection device. However, for instance, as proposed separately by the inventors of the present invention, in an embodiment where vibration of the rotor upon rotation is not transmitted appropriately to the unbalance detection device, such as a case where the housing member or the unbalance detection device supports the cartridge via a vibration insulator (described below), it is difficult to detect vibration of the rotor upon rotation appropriately even if a vibration sensor is disposed on the unbalance detection device. Further, in such a case, providing a contact-type vibration sensor for each cartridge impairs improvement of the efficiency of balancing works.

In view of the above, an object of at least one embodiment of the present invention is to provide a vibration detection device capable of providing a vibration sensor for each cartridge, without requiring a step of providing a vibration sensor.

Solution to the Problems (1) According to at least one embodiment of the present invention, a vibration detection device for detecting vibration of a cartridge including a bearing housing that accommodates a rotor coupling a wheel and a rotor shaft, and a bearing rotatably supporting the rotor, the bearing housing including a lubricant-oil passage port for allowing lubricant oil to pass through an interior of the bearing housing, includes: a sensor mount attached to an oil-flow-passage forming member configured to be capable of connecting to and separating from the bearing housing, the oil-flow-passage forming member including, inside thereof, an oil flow passage through which one of lubricant oil to be supplied to the interior of the bearing housing via the lubricant-oil passage port or lubricant oil discharged from the interior of the bearing housing via the lubricant-oil passage port flows; a vibration sensor disposed on the sensor mount; and a vibration transmission leg portion connected to the sensor mount and configured to be in contact with the bearing housing in a state where the oil-flow-passage forming member is connected to the bearing housing.

With the above configuration (1), the vibration sensor for detecting vibration caused by rotation of the rotor (rotor vibration) is attached to the side of the oil-flow-passage forming member connected to the bearing housing during the unbalance detection work of the rotor, and is configured to detect rotor vibration transmitted to the sensor mount through the vibration transmission leg portion being in contact with the bearing housing. In this way, it is not necessary to provide the sensor mount on the side of the cartridge, and it is possible to install the vibration sensor so as to enable appropriate detection of rotor vibration, by connecting the oil-flow-passage forming member to the bearing housing, without separately performing a work of installing the vibration sensor during the unbalance detection work. Accordingly, by improving the efficiency of installment of the vibration sensor to the bearing housing, it is possible to improve the efficiency of the unbalance detection work as well.

(2) In some embodiments, in the above configuration (1), the oil-flow-passage forming member includes: a rigid portion to which the sensor mount is attached; and a soft portion connected to the rigid portion, configured to be capable of connecting to and separating from the bearing housing, and formed of a softer material than the rigid portion. The soft portion includes, on a surface being in contact with the bearing housing in a state where the oil-flow-passage forming member is connected to the bearing housing, an end portion of the oil flow passage facing the lubricant-oil passage port, formed on the soft portion.

With the above configuration (2), by attaching the sensor mount to the rigid portion of the oil-flow-passage forming member, it is possible to attach the sensor mount to the oil-flow-passage forming member stably. Further, the oil-flow-passage forming member is configured to be capable of supplying lubricant oil to the lubricant-oil passage port and discharge lubricant oil from the lubricant-oil passage port, via the soft portion. In other words, a through hole forming a part of the oil flow passage is formed on the soft portion. Further, with the portion forming the oil flow passage in the soft portion, it is possible to seal lubricant oil so that the lubricant oil does not leak via the periphery of the lubricant-oil passage port, and insulate vibration to be transmitted from the oil-flow-passage forming member to the bearing housing.

(3) In some embodiments, in the above configuration (2), the oil-flow-passage forming member includes a through hole formed through at least an interior of the soft portion, the through hole being inserted onto the vibration transmission leg portion.

With the above configuration (3), the soft portion is a portion being in contact with the bearing housing, of the oil-flow-passage forming member. The through hole into which the vibration transmission leg portion is to be inserted is formed on the soft portion. Accordingly, it is possible to easily create a contact state between the bearing housing and the vibration transmission leg portion in a state where the oil-flow-passage forming member is connected to the bearing housing, without limiting the space where the vibration transmission leg portion makes contact with the bearing housing.

(4) In some embodiments, in the above configuration (3), the oil-flow-passage forming member includes a first directional portion extending along a first direction orthogonal to the rotor shaft, and a second directional portion extending along a second direction which intersects with the first direction. The through hole extends along the first direction over the rigid portion and the soft portion. The sensor mount is positioned on an extension along the first direction of the through hole.

With the above configuration (4), the vibration transmission leg portion is formed to have a linear shape, and is disposed in the through hole of the oil-flow-passage forming member. Accordingly, it is possible to form the vibration transmission leg portion having a linear shape and a short length, which makes it possible to improve the accuracy of detection of rotor vibration, such as reducing damping of the rotor vibration that occurs before arriving at the vibration sensor.

(5) In some embodiments, in the above configuration (3) or (4), a vibration insulator is disposed between the vibration transmission leg portion and the through hole formed on the rigid portion.

With the above configuration (5), it is possible to insulate vibration between the vibration transmission leg portion and the through hole formed through the rigid portion, with a vibration insulator interposed therebetween. Thus, it is possible to remove (reduce) noise components such as vibration of the oil-flow-passage forming member, from the signal detected by the vibration sensor, and thus it is possible to improve the accuracy of detection of rotor vibration by the vibration sensor.

(6) In some embodiments, in any one of the above configurations (1) to (5), the sensor mount is attached to the oil-flow-passage forming member via a second vibration insulator.

With the above configuration (6), it is possible to insulate vibration between the sensor mount and the oil-flow-passage forming member, with a vibration insulator interposed therebetween. Thus, it is possible to remove (reduce) noise components in the rotor vibration, such as vibration of the oil-flow-passage forming member, from the signal detected by the vibration sensor, and thus it is possible to improve the accuracy of detection of rotor vibration by the vibration sensor.

(7) In some embodiments, in any one of the above configurations (1) to (6), the vibration transmission leg portion includes a tip surface protruding at a predetermined curvature and configured to be in contact with the bearing housing.

With the above configuration, it is possible to improve the robust performance upon contact on the tip surface of the vibration transmission leg portion being in contact with the bearing housing.

(8) According to at least one embodiment of the present invention, an unbalance detection device for detecting vibration of a cartridge including a bearing housing that accommodates a rotor coupling a wheel and a rotor shaft, and a bearing rotatably supporting the rotor, the bearing housing including a lubricant-oil passage port for allowing lubricant oil to pass through an interior of the bearing housing, the unbalance detection device comprising: an oil-flow-passage forming member configured to be capable of connecting to and separating from the bearing housing, the oil-flow-passage forming member includes, inside thereof, an oil flow passage through which one of lubricant oil to be supplied to the interior of the bearing housing via the lubricant-oil passage port or lubricant oil discharged from the interior of the bearing housing via the lubricant-oil passage port flows; and a vibration detection device including: a sensor mount attached to the oil-flow-passage forming member; a vibration sensor disposed on the sensor mount; and a vibration transmission leg portion connected to the sensor mount and configured to be in contact with the bearing housing in a state where the oil-flow-passage forming member is connected to the bearing housing.

With the above configuration (8), it is possible to provide an unbalance detection device that has the same effect as the above (1).

Advantageous Effects

According to at least one embodiment of the present invention, it is possible to provide a vibration detection device capable of providing a vibration sensor for each cartridge without separately requiring a step of providing a vibration sensor.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have" "contain" and "constitute" are not intended to be exclusive of other components.

Figure 1:
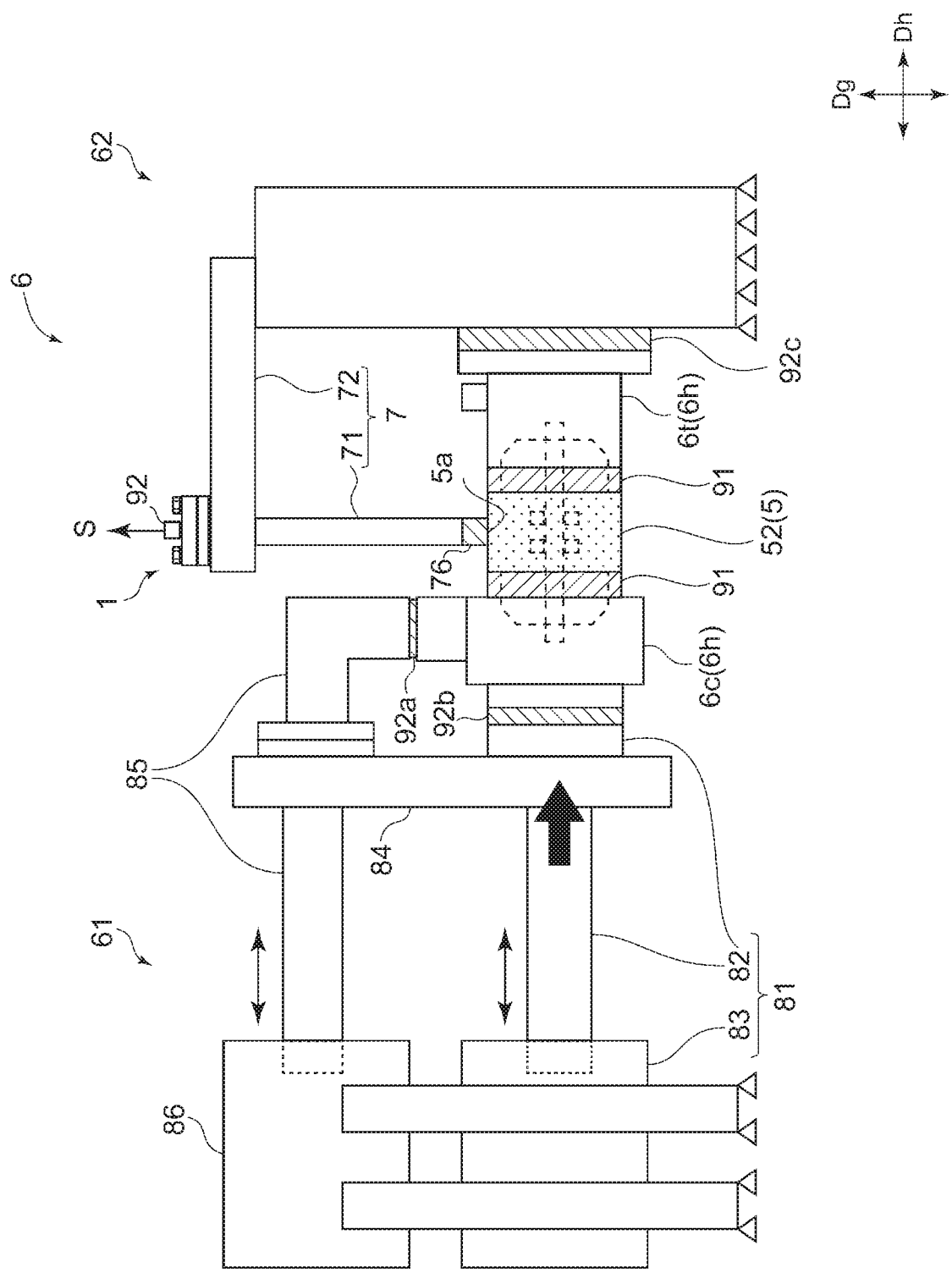
FIG. 1 is a schematic diagram of an unbalance detection device according to an embodiment of the present invention, illustrating a state where a cartridge is supported by the unbalance detection device.
Figure 2:
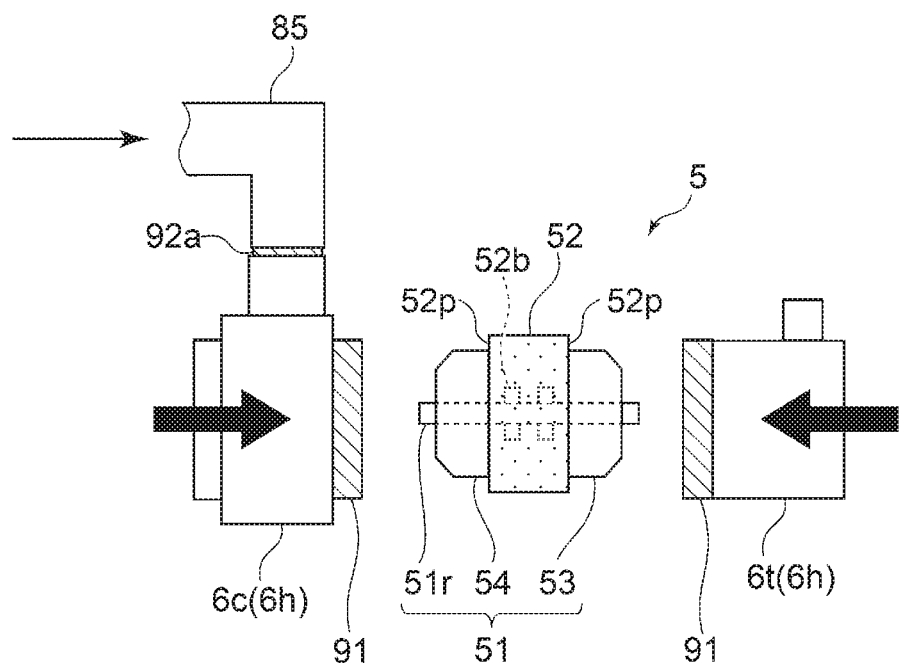
FIG. 2 is a diagram for describing how the cartridge in FIG. 1 is nipped and supported from both sides by housing members of the unbalance detection device.
Figure 2:
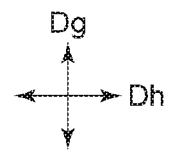

FIG. 1 is a schematic diagram of an unbalance detection device 6 according to an embodiment of the present invention, used in an unbalance correcting work for a cartridge 5, illustrating a state where the cartridge 5 is supported by the unbalance detection device 6. FIG. 2 is a diagram for describing how the cartridge 5 in FIG. 1 is nipped and supported from both sides with housing members 6h of the unbalance detection device 6.

The cartridge 5 depicted in FIGS. 1 and 2 is a core member of the turbocharger, and includes a rotor 51 integrally coupling a turbine wheel 53 and a compressor wheel 54 with a rotor shaft 51r, and a bearing housing 52 that accommodates a bearing 52b supporting the rotor 51 rotatably. Further, when the cartridge 5 is provided for an engine of a non-depicted automobile, for instance, the cartridge 5 is configured such that the turbine wheel 53 disposed in the exhaust passage of the engine rotates due to exhaust gas discharged from the engine, and thereby the compressor wheel 54 coaxially coupled by the rotor shaft 51r rotates in the intake passage of the engine, thereby compressing intake air to the engine. In the following description, the cartridge 5 for a turbocharger is used as an example. Nevertheless, in some other embodiments, the cartridge 5 may be a cartridge for a supercharger driven by power from a crank shaft (not depicted) or an electric motor.

Furthermore, the unbalance detection device 6 is a device for supporting a work target during the unbalance correction work. In the embodiment depicted in FIGS. 1 and 2, the unbalance detection device 6 nips and supports the cartridge 5 being a work target from both sides to support the cartridge 5, with two housing members 6h including a turbine-side housing member 6t and a compressor-side housing member 6c. More specifically, the unbalance detection device 6 supports the cartridge 5 by pressing at least one of the two housing members 6h to the other one of the two housing members 6h, with a support mechanism described below, while the turbine wheel 53 and the compressor wheel 54 of the cartridge 5 are housed inside the two housing members 6h (6t, 6c). Furthermore, even in a case of the cartridge 5 for a supercharger, the unbalance detection device 6 nips and supports, from both sides, the cartridge 5 including a rotor 51 including a compressor wheel 54 and a rotor shaft 51r, and a bearing housing 52 housing a bearing 52b that supports the rotor 51 rotatably.

Further, the housing members 6h support the cartridge 5 via a vibration insulator (supporting vibration insulator 91). Specifically, the support vibration insulator 91 is disposed in one of the gap between the turbine-side housing member 6t and the bearing housing 52, or the gap between the compressor-side housing member 6c and the bearing housing 52, and the support vibration insulator 91 is in contact with a support receiving portion 52p of the bearing housing 52, thereby supporting the cartridge 5. In the embodiment shown in FIGS. 1 and 2, a support vibration insulator 91 is interposed in each of the gap between the turbine-side housing member 6t and the bearing housing 52, and the gap between the compressor-side housing member 6c and the bearing housing 52. The support vibration insulator 91 is a member capable of insulating vibration (reduce vibration) between the housing members 6h and the cartridge 5, and is formed of an elastic member such as rubber, for instance. Furthermore, the support vibration insulator 91 may be a member formed of the same material as the device-side vibration insulator 92 described below, or a different material from the device-side vibration insulator 92.

According to the embodiment depicted in FIGS. 1 and 2, the support mechanism of the unbalance detection device 6 will be described in detail. As depicted in FIG. 1, the support mechanism includes a compressor-side support mechanism 61 connected to the compressor-side housing member 6c, and a turbine-side support mechanism 62 connected to the turbine-side housing member 6t. Each support mechanism (61, 62; the same applies hereafter) is fixed to the ground of a factory, for instance, so that the cartridge 5 does not move when pressed. Further, above the ground surface, the support mechanism is connected to the two housing members 6h (6t, 6c; the same applies hereafter) via a vibration insulator (device-side vibration insulator 92), which is an elastic member such as rubber. In this way, it is intended to reduce vibration on the side of the unbalance detection device 6, transmitted to the housing members 6h through the compressor-side support mechanism 61 and the turbine-side support mechanism 62 as vibration transmission paths.

Furthermore, the compressor-side support mechanism 61 includes a pressing device 81 configured to press the compressor-side housing member 6c toward the cartridge 5. The pressing device 81 includes a pressing rod 82 connected to the compressor-side housing member 6c, and a piston device 83 that pushes the pressing rod 82 out toward the compressor-side housing member 6c. The piston device 83 pushes the pressing rod 82 toward the compressor-side housing member 6c, and thereby the compressor-side housing member 6c is pressed toward the cartridge 5. At this time, the pressing device 81, the compressor-side housing member 6c, the cartridge 5, the turbine-side housing member 6t, and the turbine-side support mechanism 62 are arranged in this order along the pressing direction (direction of the arrow in FIG. 1), and the pressing force by the pressing device 81 is transmitted to the turbine-side support mechanism 62 via the arrangement of the above. The cartridge 5 is supported by the pressing force from the pressing device 81 and the reactive force from the turbine-side support mechanism 62. That is, the support mechanism pushes each of the compressor-side housing member 6c and the turbine-side housing member 6t toward the bearing housing 52, and thereby supports the cartridge 5. Furthermore, the pressing rod 82, and an air supply pipe 85 for guiding air from a blower 86 to the housing members 6h is coupled to each other via a coupling member 84, and the air supply pipe 85 is configured to move so as to expand and contract from the blower 86 as the pressing rod 82 moves in the pressing direction.

Further, as depicted in FIG. 1, the unbalance detection device 6 includes an oil-flow-passage forming member 7 for supplying lubricant oil to the bearing 52b housed in the bearing housing 52. The oil-flow-passage forming member 7 is a member configured to be capable of connecting to and separating from the bearing housing 52. Furthermore, as depicted in FIG. 1, the oil-flow-passage forming member 7 includes, inside thereof, an oil flow passage 7p through which lubricant oil to be supplied to the interior of the bearing housing 52 flows via a lubricant-oil passage port 5a (oil supply port) formed on the bearing housing 52 (see FIGS. 4 to 6 described below). Furthermore, in some other embodiments, the oil flow passage 7p of the oil-flow-passage forming member 7 may be a flow passage of lubricant oil discharged from the interior of the bearing housing 52 via a non-depicted oil discharge port (lubricant-oil passage port), after passing through the interior of the bearing housing 52 (bearing 52b), formed on the bearing housing 52. Further, in a state where the oil-flow-passage forming member 7 is connected to the bearing housing 52, an end portion of the oil flow passage 7p of the oil-flow-passage forming member 7 faces the lubricant-oil passage port 5a of the bearing housing 52, which enable passage of lubricant oil (supply of lubricant oil to the supply port or discharge of lubricant oil from the oil discharge port) between the oil flow passage 7p and the interior (flow passage) of the bearing housing 52 via the lubricant-oil passage port 5a. The lubricant oil may flow through the oil flow passage 7b in response to power from a pump (not depicted), for instance.

In the embodiment shown in FIG. 1, the oil-flow-passage forming member 7 includes, while being supported by the unbalance detection device 6, a first directional portion 71 extending along the first direction Dg orthogonal to the rotor shaft 51r of the cartridge 5 (in FIG. 1, direction along the gravity force), and a second directional portion 72 coupled to the first directional portion 71, extending along the second direction Dh that intersects with the first direction Dg (in FIG. 1, horizontal direction orthogonal to the gravity direction). Further, the unbalance detection device 6 includes a non-depicted movable mechanism capable of moving the first directional portion 71 and the second directional portion 72 in both directions along the first direction Dg (upward and downward in FIG. 1). Further, with the movable mechanism (not depicted), the oil-flow-passage forming member 7 is moved downward in the first direction Dg (gravity direction), and the oil-flow-passage forming member 7 is connected to the bearing housing 52 so that the oil flow passage 7b is in communication with the lubricant-oil passage port 5a (oil supply port) formed on an upper part of the bearing housing 52. Accordingly, it is possible to supply lubricant oil to the bearing 52b via the oil supply port. Furthermore, to bring the oil flow passage 7p into communication with the oil discharge port (non-depicted lubricant-oil passage port 5a) formed on a lower part of the bearing housing 52, the oil-flow-passage forming member 7 is moved upward by the movable mechanism.

Furthermore, the oil-flow-passage forming member 7 is connected to the bearing housing 52 via a vibration insulator (soft portion 76 described below) for insulating vibration transmitted from a member supporting the oil-flow-passage forming member 7 (turbine-side support mechanism 62 in FIG. 1), such as vibration upon supply of lubricant oil, or for sealing the periphery of the lubricant-oil passage port 5a, in a state where the vibration insulator is pushed against the bearing housing 52 (pushed state). That is, the oil-flow-passage forming member 7 includes a rigid portion 75, and a soft portion 76 connected to the rigid portion 75. The soft portion 76 is configured to be capable of connecting to and separating from the bearing housing 52, and is formed of a material softer than the rigid portion 75. In the embodiment depicted in FIGS. 1 and 2, the rigid portion 75 is a portion of the first directional portion 71 and the second directional portion 72 excluding the soft portion 76, that has a high rigidity (e.g. Young's modulus, modulus of rigidity), and is formed of metal, for instance (the same applies to FIGS. 3 to 7 described below). Furthermore, the soft portion 76 is an elastic member such as rubber, and a member formed of the same material as the above described vibration insulator (91, 92), or a different material from the vibration insulator (91, 92). Further, the soft portion 76 includes, on a surface in contact with the bearing housing 52 in a state where the oil-flow-passage forming member 7 is connected to the bearing housing 52, a tip portion of the oil flow passage 7p facing the lubricant-oil passage port 5a formed thereon. In other words, a through hole forming a part of the oil flow passage 7p is formed on the soft portion 76. Further, in a state of being connected to the bearing housing 52 (pressed state), the portion forming the oil flow passage 7p in the soft portion 76 seals lubricant oil so that the lubricant oil does not leak via the periphery of the lubricant-oil passage port 5a, and insulates vibration transmitted from the oil-flow-passage forming member 7 to the bearing housing 52.

Further, as depicted in FIG. 1, the unbalance detection device 6 includes a vibration detection device 1 capable of detecting vibration caused by rotation of the rotor 51 of the cartridge 5 (hereinafter, referred to as rotor vibration where appropriate). The vibration signal S detected by the vibration detection device 1 is sent to a non-depicted computer device along with the phase of the rotor 51 detected simultaneously, and grinding information (described above) for correcting unbalance of the rotor 51 is obtained through calculation by the computer device. The vibration detection device 1 will be described later in detail.

Further, while the unbalance detection device 6 having the above configuration supports the cartridge 5 being a work target, the cartridge 5 is rotated as in rotation due to exhaust gas during operation of the engine, and thereby unbalance of a work target is detected (unbalance detection work). Specifically, air (gas) is supplied to one of the compressor wheel 54 or the turbine wheel 53, and the rotor 51 is rotated in the actual operation range by exhaust gas, while adjusting the air mount. In the embodiment depicted in FIGS. 1 and 2, the air supply pipe 85 of the support mechanism and the compressor-side housing member 6c are connected via the device-side vibration insulator 92, and air from the blower 86 is supplied to the compressor wheel 54 housed in the compressor-side housing member 6c, via the air supply pipe 85. As the compressor wheel 54 rotates, the turbine wheel 53 rotates. Further, the compressor-side housing members 6c are connected to the air supply pipe 85 and the pressing rod 82 via the device-side vibration insulators 92 (92a, 92b), and the turbine-side housing member 6t is connected to the turbine-side support mechanism 62 via the device-side vibration insulator 92 (92c), in order to reduce vibration on the side of the unbalance detection device 6 transmitted to the housing members 6h via the compressor-side support mechanism 61 and the turbine-side support mechanism 62 as vibration transmission paths. In some other embodiments, the air supply pipe 85 and the turbine-side housing member 6t are connected, and thereby air may be supplied to the turbine wheel 53 to rotate the rotor 51.

Figure 3:
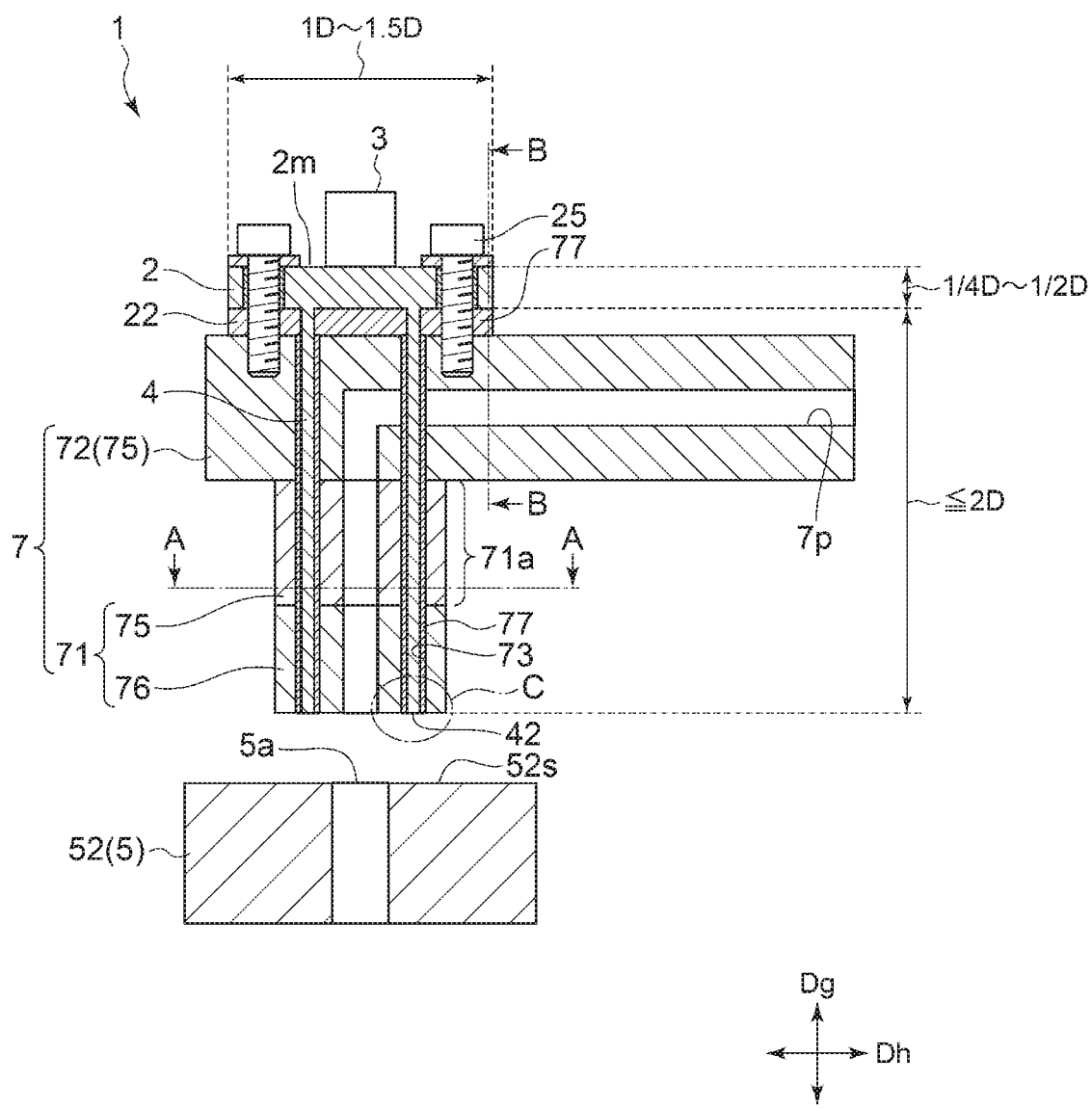
FIG. 3 is a schematic diagram of a vibration detection device according to an embodiment of the present invention, illustrating a separated state before an oil-flow-passage forming member is connected to the cartridge.
Figure 4:
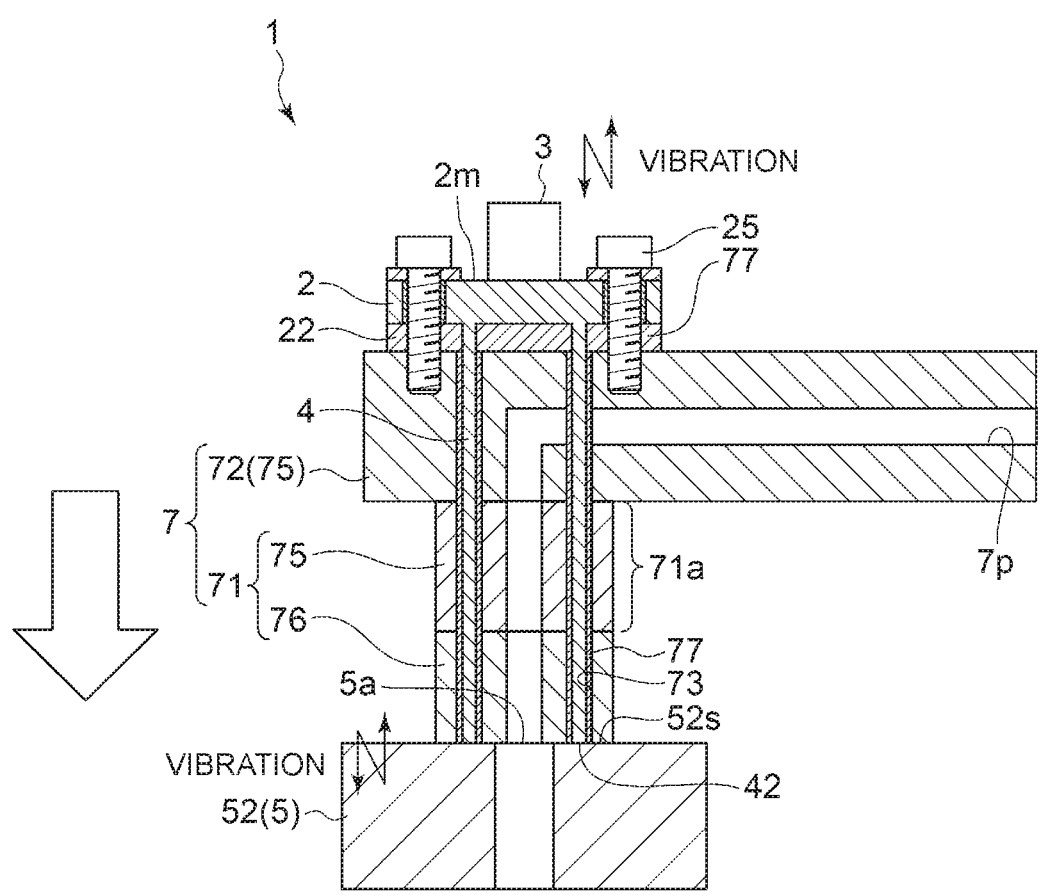
FIG. 4 is a schematic diagram of a vibration detection device according to an embodiment of the present invention, illustrating a state after an oil-flow-passage forming member is connected to the cartridge.
Figure 5:
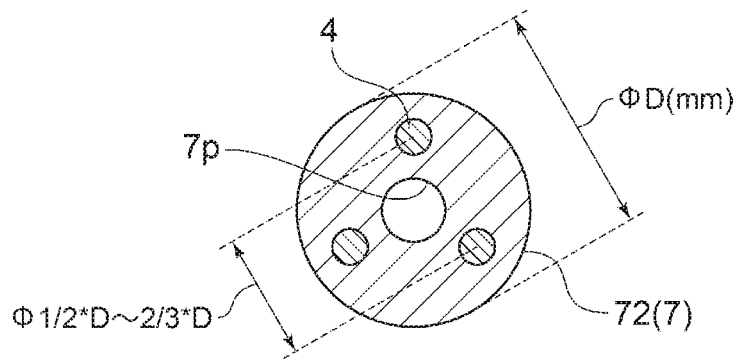
FIG. 5 is a cross-sectional view illustrating a first directional portion according to an embodiment of the present invention, showing a cross section taken along line A-A of FIG. 3.
Figure 6:
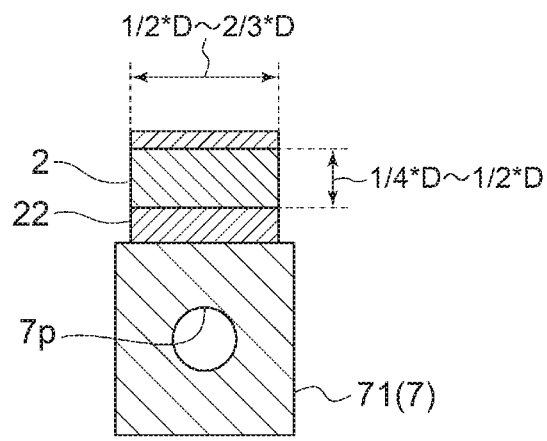
FIG. 6 is a cross-sectional view illustrating a second directional portion according to an embodiment of the present invention, showing a cross section taken along line B-B of FIG. 3.
Figure 7:
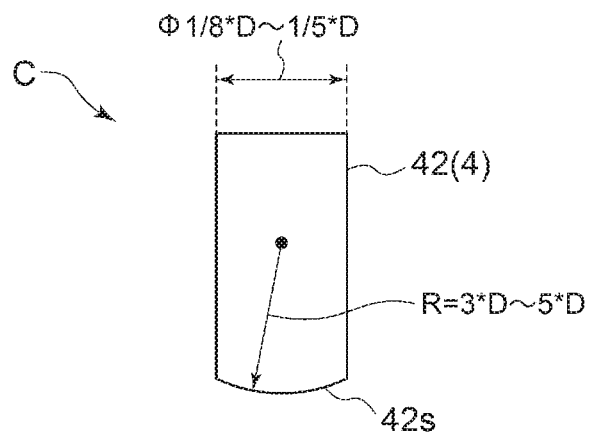
FIG. 7 is an enlarged view showing a tip portion of a vibration transmission leg portion according to an embodiment of the present invention.

Next, the above described vibration detection device 1 will be described in detail with reference to FIGS. 3 to 7. FIG. 3 is a schematic diagram of a vibration detection device 1 according to an embodiment of the present invention, illustrating a separated state before an oil-flow-passage forming member 7 is connected to the cartridge 5. FIG. 4 is a schematic diagram of a vibration detection device 1 according to an embodiment of the present invention, illustrating a state after an oil-flow-passage forming member 7 is connected to the cartridge 5. FIG. 5 is a cross-sectional view illustrating a first directional portion 71 according to an embodiment of the present invention, showing a cross section taken along line A-A of FIG. 3. FIG. 6 is a cross-sectional view illustrating a second directional portion 72 according to an embodiment of the present invention, showing a cross section taken along line B-B of FIG. 3. Further, FIG. 7 is an enlarged view showing a tip portion 42 of a vibration transmission leg portion 4 according to an embodiment of the present invention.

As depicted in FIGS. 3 to 7, the vibration detection device 1 includes a sensor mount 2, a vibration sensor 3, and a vibration transmission leg portion 4. Each of the above configuration of the vibration detection device 1 will be described.

The sensor mount 2 is a member on which the vibration sensor 3 is installed, and is attached to the above described oil-flow-passage forming member 7. In the embodiment depicted in FIGS. 3 to 7, the sensor mount 2 is formed of a plate-shaped member having a predetermined thickness, and the surface opposite to the attachment side to be installed on the oil-flow-passage forming member 7 constitutes a sensor installment surface 2m on which the vibration sensor 3 is to be installed. Further, the sensor mount 2 includes a plurality of (two in FIGS. 3 to 7) fixing unit through holes formed through the sensor mount 2 in the thickness direction. Further, the vibration detection device 1 includes fixings unit 25 (fixing screws in FIGS. 3 to 7), and in a state where the fixing units 25 are inserted into the respective fixing unit through holes of the sensor mount 2, the fixing units 25 are engaged (screwed) with engagement portions (screw holes in FIGS. 3 to 7) formed on the oil-flow-passage forming member 7 (rigid portion 75 described below), and thereby the sensor mount 2 is fixedly attached to the oil-flow-passage forming member 7.

At this time, in the embodiment depicted in FIGS. 3 to 7, the sensor mount 2 is attached to the oil-flow-passage forming member 7 via a vibration insulator (mount vibration insulator 22) for insulating vibration transmitted to the sensor mount 2 from the oil-flow-passage forming member 7. More specifically, the above fixing unit through holes are formed over the sensor mount 2 and the mount vibration insulator 22, and the fixing units 25 are configured to engage with the engagement portions of the oil-flow-passage forming member 7 while being inserted through the sensor mount 2 and the mount vibration insulator 22 on which the sensor mount 2 is installed. Further, as depicted in FIGS. 3 and 4, the mount vibration insulator 22 is disposed between the head portions of the fixing screws being the fixing units 25 and the portion of the sensor mount 2 facing the head portions (sensor installment surface 2m), and between the fixing units 25 and the fixing unit through holes of the sensor mount 2, so that the fixing units 25 do not make contact with the sensor mount 2. Accordingly, the mount vibration insulator 22 insulates vibration between the oil-flow-passage forming member 7 and the vibration detection device 1 (sensor mount 2), so that vibration of the oil-flow-passage forming member 7 is not transmitted to the sensor mount 2. Thus, it is possible to remove (reduce) noise components in the rotor vibration such as vibration of the oil-flow-passage forming member 7, from the vibration signal S detected by the vibration sensor 3, and thus it is possible to improve the accuracy of detection of rotor vibration by the vibration sensor 3. Further, it is sufficient if the sensor mount 2 can be attached to the oil-flow-passage forming member 7 with the fixing units 25. In some other embodiments, the fixing units 24 may be clamps, bands, welding, bonding, or the like.

The vibration sensor 3 is a contact-type sensor for detecting vibration, and is disposed on the sensor mount 2. In the embodiment depicted in FIGS. 3 to 7, the vibration sensor 3 is an acceleration-detection type sensor (acceleration sensor), fixed to the sensor mount 2, and is configured to detect vibration through vibration of the sensor itself along with the sensor mount 2.

The vibration transmission leg portion 4 is connected to the sensor mount 2, and is connected to the bearing housing 52 in a state where the oil-flow-passage forming member 7 is connected to the bearing housing 52. For instance, the vibration transmission leg portion 4 may be formed of a rod-shaped member. In the embodiment depicted in FIGS. 3 to 7, the vibration transmission leg portion 4 may be formed of a column-shaped member. Further, an end of the vibration transmission leg portion 4 is connected fixedly to the attachment surface (described above) of the sensor mount 2. The other end (tip portion 42) of the vibration transmission leg portion 4 has a tip surface 42s that makes contact with a vibration measurement surface 52s of the bearing housing 52 in a state where the oil-flow-passage forming member 7 is connected to the bearing housing 52. That is, in a state where the oil-flow-passage forming member 7 is connected, the sensor mount 2 and the bearing housing 52 are coupled so that vibration can be transmitted via the vibration transmission leg portion 4. More specifically, in the present embodiment, in a pressed state where the soft portion 76 is pressed against the vibration measurement surface 52s of the bearing housing 42, the tip surface 42s of the vibration transmission leg portion 4 makes contact with the vibration measurement surface 52s of the bearing housing 52. For instance, the tip surface 42s of the vibration transmission leg portion 4 has a curved surface having a semi-sphere shape or the like, and the curved surface may be in contact with the bearing housing 52.

Further, in the embodiment depicted in FIGS. 3 to 7, the vibration transmission leg portion 4 may include three rod-shaped members. Accordingly, it is possible to create a stable contact state between the vibration transmission leg portion 4 and the bearing housing 52. Nevertheless, the present invention is not limited to the present embodiment. In some other embodiments, the vibration transmission leg portion 4 may include one or more (e.g. one or two) rod-shaped members.

Herein, the vibration detection device 1 needs to prevent resonance due to overlapping of vibration caused in the operation range (e.g. 500-4000 Hz) of the cartridge 5 when actually mounted to a vehicle or the like, and the spring-mass system unique frequency of the sensor mount 2, the vibration sensor 3, and the vibration transmission leg portion 4. Thus, the sensor mount 2 needs to have as light a weight as possible while having a thickness that can be regarded as a rigid body in the above operation range, and the vibration transmission leg portion 4 needs to have a sufficient rigidity to support these. Thus, in the embodiment depicted in FIGS. 3 to 7, with reference to the outer diameter D (e.g. mm) of the first directional portion 71 having a column shape (see FIG. 5), the vertical length of the sensor mount 2 (in the longitudinal direction) is 1×D–1.5×D (see FIG. 3), the lateral length of the sensor mount 2 (in the lateral direction) is ½×D–⅔×D (see FIG. 6), the thickness of the sensor mount 2 is ¼×D–½×D (see FIG. 6), the length of the vibration transmission leg portion 4 is not more than 2×D, and the outer diameter of the vibration transmission leg portion 4 is ⅛×D–⅕×D (see FIG. 7). Further, the vibration transmission leg portion 4 is made of a material having a high Young modulus (e.g. steel), and the sensor mount 2 is made of a material having a small density (e.g. aluminum).

Further, in the unbalance detection work, the rotor vibration of the rotor 51 due to unbalance of the rotor 51 is transmitted to the bearing 52b supporting the rotor 51, and then transmitted to the bearing housing 52 supporting the bearing 52b. Furthermore, the rotor vibration transmitted to the bearing housing 52 is transmitted to the sensor mount 2 via the vibration transmission leg portion 4 being in contact with the vibration measurement surface 52s. Thus, the vibration sensor 31 detects rotor vibration transmitted to the sensor mount 2 as described above, by being mounted to the sensor mount 2.

With the above configuration, the vibration sensor 3 for detecting vibration caused by rotation of the rotor 51 (rotor vibration) is attached to the side of the oil-flow-passage forming member 7 connected to the bearing housing 52 during the unbalance detection work of the rotor 51, and is configured to detect rotor vibration transmitted to the sensor mount 2 through the vibration transmission leg portion 4 being in contact with the bearing housing 52 (vibration measurement surface 52s). Accordingly, it is not necessary to provide the sensor mount 2 on the side of the cartridge 5, and it is possible to install the vibration sensor 3 so as to enable appropriate detection of rotor vibration, by connecting the oil-flow-passage forming member 7 to the bearing housing 52, without separately performing a work of installing the vibration sensor 3 during the unbalance detection work. Accordingly, by improving the efficiency of installment of the vibration sensor 3 to the bearing housing 52, it is possible to improve the efficiency of the unbalance detection work as well.

Next, some embodiments related to the vibration detection device 1 will be described.

In some embodiments, as depicted in FIGS. 1, 3 to 7, the sensor mount 2 is attached to the rigid portion 75 of the above described oil-flow-passage forming member 7. In the embodiment depicted in FIGS. 1, 3 to 7, the sensor mount 2 is attached to the upper surface of the rigid portion 75. Nevertheless, in some other embodiments, the sensor mount 2 may be attached to the side surface of the rigid portion 75.

With the above configuration, by attaching the sensor mount 2 to the rigid portion 75 of the oil-flow-passage forming member 7, it is possible to attach the sensor mount 2 to the oil-flow-passage forming member 7 stably.

However, the present invention is not limited to the present embodiment. In some other embodiments, at least a part of the sensor mount 2 may be attached to the soft portion 76 of the oil-flow-passage forming member 7, and in this case, similarly to the above, the vibration transmission leg portion 4 may have a linear shape, or may have one or more bend portion.

Further, in some embodiments, as depicted in FIGS. 3 to 7, the oil-flow-passage forming member 7 includes a through hole 73 formed through at least the interior of the soft portion 76, through which the above described vibration transmission leg portion 4 is inserted. That is, the through hole 73 may be formed only on the soft portion 76, or both of the rigid portion 75 and the soft portion 76. In the former embodiment, in which the through hole 73 is formed only through the soft portion 76, for instance, a portion of the rigid portion 75 of the first directional portion 71 (e.g. portion indicated as 71a) has a shorter length (width) along the second direction Dh than the soft portion 76. Further, for instance, by installing the sensor mount 2 on a portion of the rigid portion 75 (same as above), it is possible to insert and install the vibration transmission leg portion 4 having a linear shape into the through hole 73 formed on the soft portion 76. Alternatively, in a case where the sensor mount 2 is disposed on the side surface of the rigid portion 75 different from the above portion (same as above), the vibration transmission leg portion 4 has a bend portion, and thereby it possible to insert and install the vibration transmission leg portion 4 into the through hole 73 formed on the soft portion 76.

The latter embodiment, in which the through hole 73 is formed through both of the rigid portion 75 and the soft portion 76, is depicted in FIGS. 3 to 7. Specifically, the through hole 73 is formed through both of the rigid portion 75 and the soft portion 76, and thereby extends along the first direction Dg (described above) over the rigid portion 75 and the soft portion 76. Further, the sensor mount 2 is positioned on the extension along the first direction Dg of the through hole 73. That is, the sensor mount 2 is disposed on the upper portion of the oil-flow-passage forming member 7 so as to be placed on the oil-flow-passage forming member 7. Thus, the vibration transmission leg portion 4 is formed to have a linear shape, and is attached to the oil-flow-passage forming member 7, in a state where the vibration transmission leg portion 4 is fixedly connected to the sensor mount 2, and is inserted through the through hole formed on the mount vibration insulator 22 and the through hole 73 formed over the rigid portion 75 and the soft portion 76 of the oil-flow-passage forming member 7 in this order. Accordingly, it is possible to form the vibration transmission leg portion 4 having a linear shape and a short length, which makes it possible to improve the accuracy of detection of rotor vibration, such as reducing damping of the rotor vibration that occurs before arriving at the vibration sensor 3.

Further, in the embodiment depicted in FIGS. 3 to 7, the through hole 73 of the oil-flow-passage forming member 7 is formed in continuation in the oil-flow-passage forming member 7. Nevertheless, the present invention is not limited to the present embodiment. In some other embodiments, the through hole 73 of the oil-flow-passage forming member 7 may include a plurality of sections. For instance, in some embodiments, a portion of the rigid portion 75 of the first directional portion 71 (e.g. portion indicated as 71a) may have a shorter length (width) along the second direction Dh than the soft portion 76, and the through hole 73 may break at the portion (same as above) so that the vibration transmission leg portion 4 is exposed to outside. Accordingly, it is possible to reduce a portion where the vibration transmission leg portion 4 may make contact with the rigid portion 75, and reduce the noise component in the rotor vibration transmitted from the rigid portion 75.

With the above configuration, the soft portion 76 is a portion being in contact with the bearing housing 52, of the oil-flow-passage forming member 7. The through hole 73 into which the vibration transmission leg portion 4 is to be inserted is formed on the soft portion 76. Accordingly, it is possible to easily create a contact state between the bearing housing 52 and the vibration transmission leg portion 4 in a state where the oil-flow-passage forming member 7 is connected to the bearing housing 5, without limiting the space where the vibration transmission leg portion 4 makes contact with the bearing housing 52.

However, the present invention is not limited to the present embodiment. In some other embodiments, the vibration detection device 1 may be installed so that the vibration transmission leg portion 4 is exposed to the outside without passing through the interior (through hole 73) of the oil-flow-passage forming member 7. For instance, with the sensor mount 2 being attached to the side surface of the oil-flow-passage forming member 7 and the vibration transmission leg portion 4 extending along the first direction Dg, the vibration transmission leg portion 4 may be entirely exposed to the outside, without having a portion that extends through the interior of the oil-flow-passage forming member 7. Alternatively, by having one or more bend portions, the vibration transmission leg portion 4 may be entirely exposed to the outside. More specifically, the sensor mount 2 may be installed on the upper portion of the oil-flow-passage forming member 7 for instance, and the vibration transmission leg portion 4 may have a bend portion that bypasses the oil-flow-passage forming member 7. Even in such a case, it is possible to reduce the above described limitation related to space. For instance, even if the cross-sectional area of the vibration transmission leg portion 4 is small and it is difficult to ensure a space that can serve as the sensor mount 2 to be in contact with the vibration sensor 3 on the bearing housing 52, it is possible to ensure the vibration measurement surface 52s.

Further, in the above described embodiment, in which the oil-flow-passage forming member 7 has the through hole 73, in some embodiments, as depicted in FIGS. 3 to 7, a vibration insulator (hole vibration insulator 77) may be disposed between the vibration transmission leg portion 4 and the through hole 73 formed on the rigid portion 75. That is, between the vibration transmission leg portion 4 and the through hole 73 formed on the rigid portion 75, a space (annular space) is formed for there is a predetermined distance therebetween, and the hole vibration insulator 77 is interposed in the space. In the embodiment depicted in FIGS. 3 to 7, the hole vibration insulator 77 is packed in the space between the through hole 73 of the oil-flow-passage forming member 7 and the vibration transmission leg portion 4. Furthermore, the predetermined distance forming the above space may not be the same over the entire section. Further, the hole vibration insulator 77 may be also interposed (packed) between the vibration transmission leg portion 4 and the through hole 73 formed on the soft portion 76.

With the above configuration, it is possible to insulate vibration between the vibration transmission leg portion 4 and the through hole 73 formed through the rigid portion 75, with a vibration insulator (77) interposed therebetween. Thus, it is possible to remove (reduce) noise components such as vibration of the oil-flow-passage forming member 7, from the signal detected by the vibration sensor 3, and thus it is possible to improve the accuracy of detection of rotor vibration by the vibration sensor 3.

However, the present invention is not limited to the present embodiment. In some other embodiments, a vibration insulator may not necessarily be disposed in the above space between the vibration transmission leg portion 4 and the through hole 73 formed through the rigid portion 75 or both of the rigid portion 75 and the soft portion 76. Even in this case, it is possible to insulate vibration between the vibration transmission leg portion 4 and the rigid portion 75 with the space.

Further, in some embodiments, as depicted in FIG. 7, the vibration transmission leg portion 4 includes a tip surface 42s protruding at a predetermined curvature R configured to be in contact with the bearing housing 52. The curvature R is set to be such a large value that can reduce deformation of the contact point and increase the rigidity.

With the above configuration, it is possible to improve the robust performance upon contact on the tip surface 42s of the vibration transmission leg portion 4 being in contact with the bearing housing 52.

Embodiments of the present invention were described in detail above, but the present invention is not limited thereto, and various amendments and modifications may be implemented.

DESCRIPTION OF REFERENCE NUMERALS

1 Vibration detection device
2 Sensor mount
22 Mount vibration insulator
2m Sensor installment surface
25 Fixing screw
3 Vibration sensor
4 Vibration transmission leg portion
42 Tip portion
42s Tip surface
5 Cartridge
5a Lubricant-oil passage port
51 Rotor
51r Rotor shaft 52 Bearing housing
52b Bearing
52p Support receiving portion
52s Vibration measurement surface
53 Turbine wheel
54 Compressor wheel
6 Unbalance detection device
6c Compressor-side housing member
6h Housing member
6t Turbine-side housing member
61 Compressor-side support mechanism
62 Turbine-side support mechanism
7b Oil-flow-passage forming member
7p Oil flow passage
71 First directional portion
71a Part of first directional portion
72 Second directional portion
73 Through hole
75 Rigid portion
76 Soft portion
77 Hole vibration insulator
81 Pressing device
82 Pressing rod
83 Piston device
84 Coupling member
85 Air supply pipe
86 Blower
91 Support vibration insulator
92 Device-side vibration insulator
Dg First direction
Dh Second direction
S Vibration signal
D Outer diameter (first directional portion)
R Curvature

The invention claimed is:

1. A vibration detection device for detecting vibration of a cartridge including a bearing housing that accommodates a rotor coupling a wheel and a rotor shaft, and a bearing rotatably supporting the rotor, the bearing housing including a lubricant-oil passage port for allowing lubricant oil to pass through an interior of the bearing housing, the vibration detection device comprising:
a sensor mount attached to an oil-flow-passage forming member configured to be capable of connecting to and separating from the bearing housing, the oil-flow-passage forming member including, inside thereof, an oil flow passage through which one of lubricant oil to be supplied to the interior of the bearing housing via the lubricant-oil passage port or lubricant oil discharged from the interior of the bearing housing via the lubricant-oil passage port flows;
a vibration sensor disposed on the sensor mount; and
a vibration transmission leg portion connected to the sensor mount and configured to be in contact with the bearing housing in a state where the oil-flow-passage forming member is connected to the bearing housing,
wherein the oil-flow-passage forming member includes:
a rigid portion to which the sensor mount is attached; and
a soft portion connected to the rigid portion, configured to be capable of connecting to and separating from the bearing housing, and formed of a softer material than the rigid portion,
wherein the soft portion includes, on a surface being in contact with the bearing housing in a state where the oil-flow-passage forming member is connected to the bearing housing, an end portion of the oil flow passage facing the lubricant-oil passage port, formed on the soft portion, and
wherein the oil-flow-passage forming member includes a through hole formed through at least an interior of the soft portion, the through hole being inserted onto the vibration transmission leg portion.

2. The vibration detection device according to claim 1, wherein the oil-flow-passage forming member includes a first directional portion extending along a first direction orthogonal to the rotor shaft, and a second directional portion extending along a second direction which intersects with the first direction,
wherein the through hole extends along the first direction over the rigid portion and the soft portion, and
wherein the sensor mount is positioned on an extension along the first direction of the through hole.

3. The vibration detection device according to claim 1, wherein a vibration insulator is disposed between the vibration transmission leg portion and the through hole formed on the rigid portion.

4. The vibration detection device according to claim 1, wherein the sensor mount is attached to the oil-flow-passage forming member via a second vibration insulator.

5. The vibration detection device according to claim 1, wherein the vibration transmission leg portion includes a tip surface protruding at a predetermined curvature and configured to be in contact with the bearing housing.

6. An unbalance detection device for detecting vibration of a cartridge including a bearing housing that accommodates a rotor coupling a wheel and a rotor shaft, and a bearing rotatably supporting the rotor, the bearing housing including a lubricant-oil passage port for allowing lubricant oil to pass through an interior of the bearing housing, the unbalance detection device comprising:
an oil-flow-passage forming member configured to be capable of connecting to and separating from the bearing housing, the oil-flow-passage forming member including, inside thereof, an oil flow passage through which one of lubricant oil to be supplied to the interior of the bearing housing via the lubricant-oil passage port or lubricant oil discharged from the interior of the bearing housing via the lubricant-oil passage port flows; and
a vibration detection device including: a sensor mount attached to the oil-flow-passage forming member; a vibration sensor disposed on the sensor mount; and a vibration transmission leg portion connected to the sensor mount and configured to be in contact with the bearing housing in a state where the oil-flow-passage forming member is connected to the bearing housing,
wherein the oil-flow-passage forming member includes:
a rigid portion to which the sensor mount is attached; and
a soft portion connected to the rigid portion, configured to be capable of connecting to and separating from the bearing housing, and formed of a softer material than the rigid portion,
wherein the soft portion includes, on a surface being in contact with the bearing housing in a state where the oil-flow-passage forming member is connected to the bearing housing, an end portion of the oil flow passage facing the lubricant-oil passage port, formed on the soft portion, and
wherein the oil-flow-passage forming member includes a through hole formed through at least an interior of the soft portion, the through hole being inserted onto the vibration transmission leg portion.

\* \* \* \* \*